(12) United States Patent
Hui et al.

(10) Patent No.: US 8,107,965 B2
(45) Date of Patent: Jan. 31, 2012

(54) DISTRIBUTED COMPUTATION OF PRECODING WEIGHTS FOR COORDINATED MULTIPOINT TRANSMISSION ON THE DOWNLINK

(75) Inventors: Dennis Hui, Cary, NC (US); Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 350 days.

(21) Appl. No.: 12/547,817

(22) Filed: Aug. 26, 2009

(65) Prior Publication Data

US 2010/0290382 A1 Nov. 18, 2010

Related U.S. Application Data

(60) Provisional application No. 61/178,094, filed on May 14, 2009.

(51) Int. Cl.
*H04W 52/30* (2009.01)
(52) U.S. Cl. ...................... 455/448; 455/561; 455/127.1
(58) Field of Classification Search .................. 455/561, 455/562.1, 127.1, 448
See application file for complete search history.

(56) References Cited

U.S. PATENT DOCUMENTS

2007/0280175 A1    12/2007  Cheng et al.
2010/0317355 A1*  12/2010  Zangi et al. .................. 455/450
2010/0323611 A1*  12/2010  Choudhury ..................... 455/7
2011/0070918 A1*   3/2011  Hafeez ......................... 455/522
2011/0080961 A1*   4/2011  Hui et al. ..................... 375/259

FOREIGN PATENT DOCUMENTS

WO      WO 2011009486 A1 *  1/2011

OTHER PUBLICATIONS

Michael Joham, "Linear Transmit Processing in Mimo Communications Systems"; IEEE Transactions on Signal Processing, vol. 53, No. 8, Aug. 2005.
Michael Joham, "Transmit Wiener Filter for the Downlink of TDDDS-CDMA Systems" IEEE $7^{th}$ Int Symp. on Spread-Spectrum Tech. & Appl. Prague. Czech Republic, Sep. 2-5, 2002.
Hassen Karaa, "Linear Precoding for Multiuser MIMO-OFDM Systems", ICC 2007 proceedings.

* cited by examiner

*Primary Examiner* — Melvin Marcelo

(57) ABSTRACT

In a Coordinated Multi-point (CoMP) system, the base station (BS) in each serving cell (or sector) is allowed to use not only its own antennas, but also the antennas of neighboring BSs to transmit to mobile terminals in the serving cell to form a floating CoMP cell. The serving BS in each floating CoMP cell computes tentative linear precoding weights for transmissions from the coordinating BSs in the floating CoMP cell to users in the serving cell of the floating CoMP cell. The serving BS determines the power availability for transmit antennas in the floating CoMP cell that are shared with other floating CoMP cells, and scales the tentative precoding weights based on the power availability of the shared transmit antennas to determine final precoding weights so that the power constraints of the shared transmit antennas will not be violated.

16 Claims, 5 Drawing Sheets

DISTRIBUTED COMPUTATION OF PRECODING WEIGHTS FOR COORDINATED MULTIPOINT TRANSMISSION ON THE DOWNLINK

RELATED APPLICATION

This application claims the priority benefit of U.S. Provisional Patent Application 61/178,094, filed 14 May 2009, which is incorporated herein by reference.

BACKGROUND

The present invention relates generally to coordinated multipoint (CoMP) transmission for the downlink in a mobile communication network and, more particularly, to a method and apparatus for computing precoding weights for a CoMP transmission in a distributed manner to reduce interference between neighboring CoMP cells.

The phenomenal growth in the demand for wireless communications has put a persistent pressure on cellular network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to users at the cell edges, but also the overall system throughput.

Coordinated Multi-Point (CoMP) transmission (or reception) is one technique being employed to mitigate inter-cell interference. The basic idea behind CoMP on the downlink is to connect multiple base-stations from several adjacent cell sites to a centralized processing unit (CPU), thus forming a "super-cell", called a CoMP cell, such that transmissions to multiple user equipments (UEs) within each CoMP cell can be coordinated to reduce mutual interference among UEs. However, there is little or no coordination among CPUs of different CoMP cells in such a centralized architecture.

In the conventional centralized CoMP architecture, the users near the edge of a CoMP cell can experience substantially degraded service quality compared to those near the center of the CoMP cell due to the uncoordinated interference from other neighboring CoMP cells. This interference creates a large service quality disparity among users in the network. In fact, one can view that the centralized CoMP architecture is essentially the same as the traditional non-CoMP architecture except that the CoMP cells are larger and that the network antennas are distributed more evenly throughout each CoMP cell.

In order to reduce the portion of users being adversely affected by the uncoordinated inter-CoMP-cell interference, the number of cells included in each CoMP cell has to be large, posing difficult problems in synchronization due to signal delays over both the air and the wire. In addition, the cost increase in building and maintaining the backhaul connecting a large number of cell sites to the CPU in a large CoMP cell can also be substantial. Moreover, the centralized architecture is not easily scalable to future traffic increase in each CoMP cell, since adding a new cell-site requires a new backhaul connection to the CPU and a change in the processing algorithms at the CPU to accommodate the new site.

SUMMARY

The present invention provides a method and apparatus for computing, in a distributed manner, linear precoding weights for downlink coordinated multi-point (CoMP) transmission.

According to one embodiment of the present invention, the base station (BS) in each serving cell (or sector) is allowed to use not only its own antennas, but also the antennas of neighboring BSs to transmit to mobile terminals in the serving cell. The set of BSs (cells) used to transmit data to mobile terminals in a particular cell is referred to herein as the coordination set, and the members of the coordination set as the coordinating BSs (cells). The cells in the coordination set form a "floating" CoMP cell, which may overlap with other floating CoMP cells.

The serving BS in each floating CoMP cell computes tentative linear precoding weights for the downlink transmissions from the coordinating BSs to mobile terminals in the serving cell of the coordination set. The serving BS then determines the power availability for transmit antennas in the floating CoMP cell that are shared with other floating CoMP cells, and scales the tentative precoding weights based on the power availability of the shared transmit antennas to determine final precoding weights for said CoMP transmission so that the power constraints of the shared transmit antennas will not be violated.

Exemplary embodiments of the invention include methods of coordinating multipoint transmissions in a mobile communication network having CoMP cells that overlap. One exemplary method implemented by a serving cell in a CoMP cell comprises computing tentative precoding weights for a CoMP transmission from a plurality of transmit antennas in two or more coordinating cells of a CoMP cell to one or more mobile terminals in a serving cell of the CoMP cell, at least one of said transmit antennas being shared with an overlapping CoMP cell; determining a power availability for said shared transmit antennas in said CoMP cell; and scaling the tentative precoding weights based on the power availability of said shared transmit antennas to determine final precoding weights for said CoMP transmission.

Another exemplary method implemented by a coordinating cell of a CoMP cell comprises receiving, from serving cells in two or more CoMP cells, transmit power requirements for one or more transmit antennas shared by said two or more CoMP cells; determining power availability for each shared transmit antenna based on said received transmit power requirements; and reporting said power availability for each shared antenna to said serving cells.

Other embodiments of the present invention comprise a serving base station (BS) in a CoMP cell. One exemplary serving BS comprises transmit signal processor configured to compute tentative precoding weights for a CoMP transmission from a plurality of transmit antennas in two or more coordinating cells of said CoMP cell to one or more mobile terminals in a serving cell of the CoMP cell, at least one of said transmit antennas being shared with an overlapping CoMP cell; determine a power availability for said shared transmit antennas in said CoMP cell; and scale the tentative precoding weights based on the power availability of said shared transmit antennas to determine final precoding weights for said CoMP transmission.

Other embodiments of the invention comprise a coordinating BS in a CoMP cell. One exemplary coordinating BS comprises a transmit signal processor configured to receive, from serving cells in two or more CoMP cells, transmit power requirements for one or more transmit antennas shared by said two or more CoMP cells; determine power availability for each shared transmit antenna based on said received transmit power requirements; and report said power availability for each shared antenna to said serving cells.

DETAILED DESCRIPTION

Figure 1:
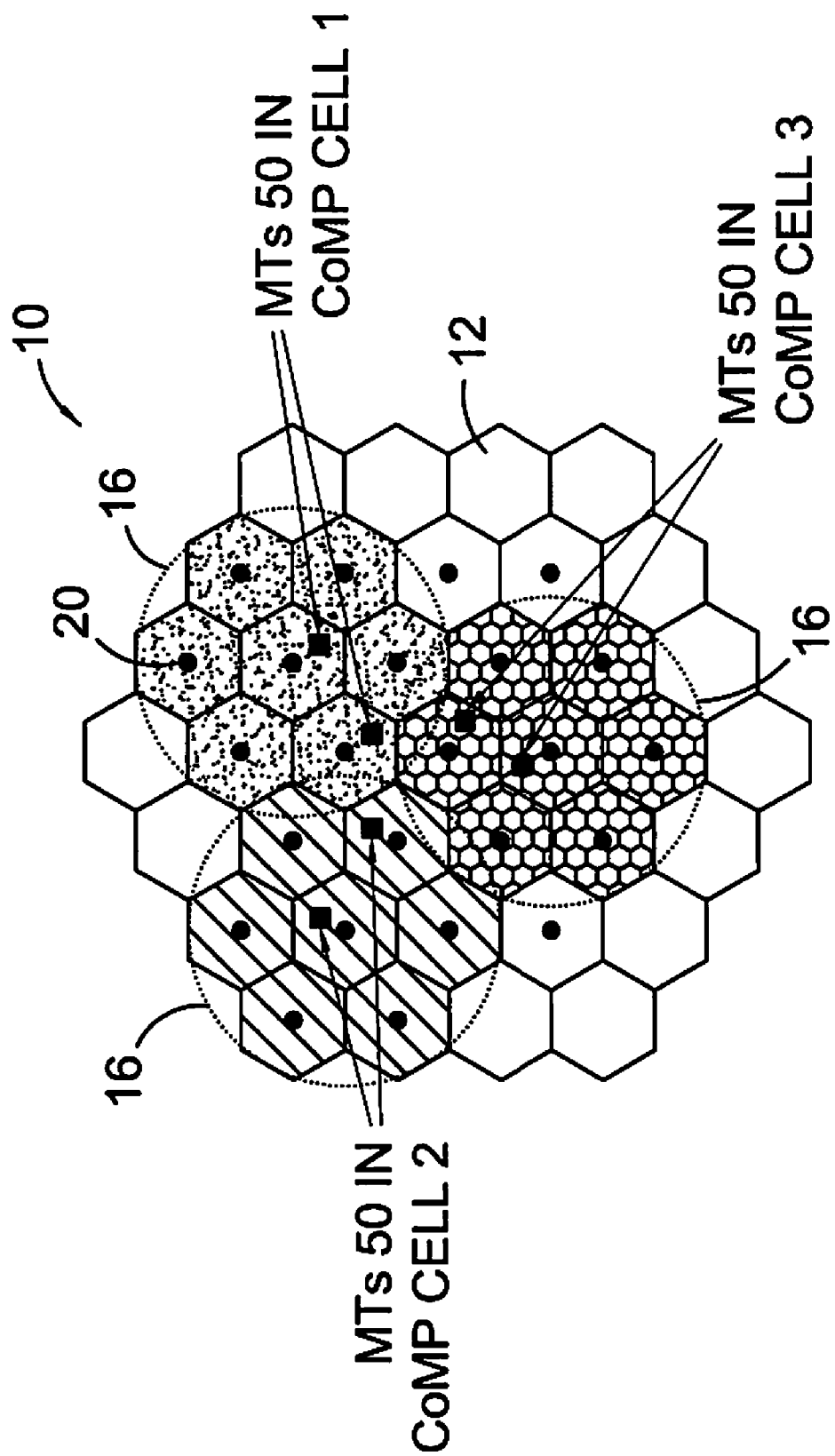
FIG. 1 illustrates fixed CoMP cells in a mobile communication network.

Referring now to the drawings, FIG. 1 shows a mobile communication network 10 that employs coordinated multipoint (CoMP) transmission for downlink communications with mobile terminals 50. Mobile communication network 10 may use any communications standards now known or later developed. For example, the mobile communication network 10 may comprise a Wideband Code Division Multiple Access (WCDMA) network, and Long Term Evolution (LTE) network, or WiMAX network. The coverage area of mobile communication network 10 is divided into smaller regions referred to as cells 12. Each cell 12 is served by a base station (BS) 20 that is typically located at the center of the cell 12. For ease of description, it is assumed that the antennas at each base station 20 are omni-directional, but the present invention applies also to sectorized cells as well.

As depicted in FIG. 1, all cells 12 in the mobile communication network 10 are divided into non-overlapping groups of cells, referred to as CoMP cells 16. The BSs 20 of each CoMP cell 16 transmit to all mobile terminals 50 within the corresponding CoMP cell 16 in a coordinated fashion to maximize the user data throughput while reducing the mutual interference among mobile terminals 50. The coordination is accomplished through a centralized transmit processor (not shown) connecting to all BSs 20 in the CoMP cell 16. CoMP cells 16 do not overlap and the set of BSs 20 in each CoMP cell 16 are disjoint. There is little or no coordination between CoMP cells 16. As a result, the mobile terminals 50 located near the boundary of a CoMP cell 16 can experience substantial service degradation due to uncontrolled interference from neighboring CoMP cells 16.

Figure 2:
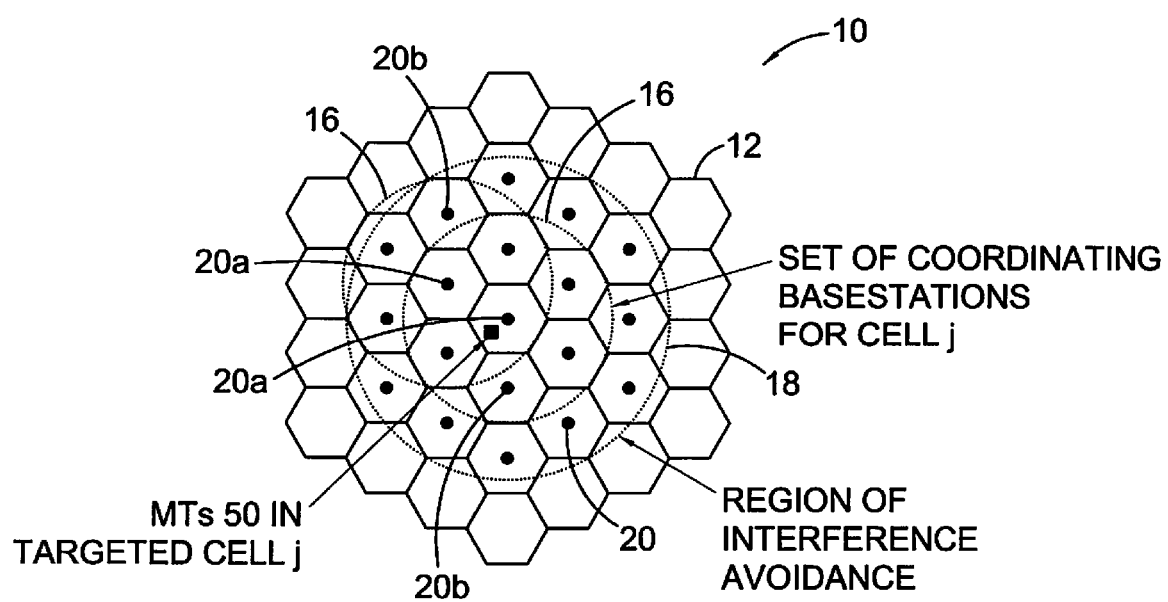
FIG. 2 illustrates floating CoMP cells in a mobile communication network.

FIG. 2 illustrates a mobile communication network 10 using a distributed architecture for CoMP transmission. In the mobile communication network 10 shown in FIG. 2, the BS 20 in each cell 12 is allowed to use not only its own antennas, but also the antennas of neighboring BSs 20 to transmit to mobile terminals 50 in its own cell 12. The set of BSs 20 (or cells 12) used to transmit data to mobile terminals 50 in a particular cell 12 is referred to herein as the coordination set, and the members of the coordination set as the coordinating BSs 20 (or cells 12). The cells 12 in the coordination set form a "floating" CoMP cell 16, which may overlap with other floating CoMP cells 16. The coordination set comprises one serving BS 20aa and one or more non-serving BSs 20b. The BS 20 (or cell 12) in the center of each floating CoMP cell 16, whose mobile terminals 50 are being served by the antennas in each floating CoMP cell 16 functions as the serving BS 20a (or cell 12) of the floating CoMP cell 16. FIG. 2 shows two overlapping floating CoMP cells 16 whose serving cells 12 are adjacent to each other.

It may be noted that each cell 12 may be a member of two or more floating CoMP cells 16. Further, it may be noted that the serving cell 12 in one CoMP cell 16 may also be a member of one or more other CoMP cells 16. Thus, the antennas at each BS 20 (or cell 12) are likely to be shared by multiple CoMP cells 16.

As will be described in greater detail below, the serving BS 20a (or cell 12) in each floating CoMP cell 16 is responsible for computing precoding weights for downlink transmission to mobile terminals 50 in the serving cell 12. Because the antennas of each cell 12 are shared by multiple floating CoMP cells 16, the computation of the precoding weights takes into account the power availability at each antenna in the floating CoMP cell 16. The serving BS 20a provides the precoding weights to each of non-serving BSs 20b in the floating CoMP cell 16, which use the precoding weights to filter the downlink transmissions to mobile terminals 50 in the serving cell 12.

In some embodiments, the serving BS 20a in each floating CoMP cell 16 may compute precoding weights so as to minimize or reduce interference with mobile terminals 50 in an interference avoidance region 18. The interference avoidance region includes the coordinating cells 12 in the floating CoMP cell 16 and the neighboring cells outside the floating CoMP cell 16. Thus, mobile terminals 50 in each serving cell 12 are served by the antennas from the BSs 20 in the coordination set of the floating CoMP cell 16 in such a way that the transmission would cause little or no interference with other mobile terminals 50 in the region of interference avoidance 18. To facilitate interference avoidance, each mobile terminal 50 should measure and report the relevant (instantaneous or averaged) channel state information to the serving BS 20a in each floating CoMP cell 16.

As previously noted, the serving BS 20a in each CoMP cell 16 computes precoding weights for the coordinating BSs 20 in the floating CoMP cell 16, including the precoding weights for the serving BS 20a. Consider the $j^{th}$ floating CoMP cell 16 with $n_{b,j}$ BSs 20 in its coordination set $C_j$ used to transmit signals to $K_j$ mobile terminals 50 in the serving cell 12 of the floating CoMP cell 16 while trying to limit interference to other $L_j$ mobile terminals 50 in the region of interference avoidance 18. The number of available transmit antennas at each BS 20 in the coordination set $C_j$ is denoted by $n_t(i)$, where i indexes the BS 20 in the coordination set $C_j$. The total number of transmit antenna for the floating CoMP cell 16 is thus given by $$n_{t,j} = \prod_{i \in C_j} n_t(i).$$

The set of mobile terminal indices for the $K_j$ mobile terminals 50 in the serving cell 12 that will be served by the coordination set $C_j$ may be denoted as $A_j = \{1, 2, L, K_j\}$ and the set of mobile terminal indices for the $L_j$ mobile terminals 50 in the region of interference avoidance 18 may be denoted by $B_j = \{K_j+1, K_j+2, L, K_j+L_j\}$ for whom interference is being suppressed. It is not necessary to include all of the mobile terminals in the interference avoidance region 18 in the set $B_j$. It is sufficient to include only those mobile terminals in the interference avoidance region 18 that are scheduled by other floating cells to receive data. For each $k \in A_j \cup B_j$, $H_{j,k}$ is a $n_{r,k}$ by $n_{t,j}$ channel response matrix representing the channel from the antennas at the coordinating BSs 20 to the receiver antennas of the $k^{th}$ mobile terminal 50, where $n_{r,k}$ denotes the number of receive antennas at the $k^{th}$ mobile terminal 50. $P_{j,k}$ denotes an $n_{t,j}$-by-$n_{s,k}$ precoding matrix (or matrix of precoding weights) for the $k^{th}$ mobile terminal 50, where $n_{s,k}$ denotes the number of data streams transmitted to the $k^{th}$ mobile terminal 50. For notational simplicity, we let $P_j=[P_{j,1}, P_{j,2}, L, P_{j,K_1}]$ and $H_j=[H_{j,1}{}^H, H_{j,2}{}^H, L, H_{j,K_j+L_1}{}^H]^H$.

To transmit data to the $k^{th}$ mobile terminal 50, the coordinating BSs 20 in the floating CoMP cell 16 modulate the data bits into a $n_{s,k}$-by-1 symbol vector $s_k$, and then combine the symbol vector $s_k$ with the precoding weights $P_k$ such that the total transmitted signal from the coordinating BSs 20 in the floating CoMP cell 16 to the mobile terminals 50 in the serving cell 12 is the (weighted) sum of all precoded signals to all $K_j$ mobile terminals 50 given by:

$$x_j = \delta_j \sum_{k=1}^{K_j} P_{j,k} s_k, \quad \text{Eq. (1)}$$

where $\delta_j$ denotes a power scaling or back-off factor for the $j^{th}$ floating CoMP cell 16. It is assumed that the symbol vector $s_k$ is normalized such that $Es_k s_k{}^H = 1$. The overall precoding weights are given by $\delta_j P_j$, and for clarification, we refer to $P_j$ as the tentative precoding weights. The scaling factor $\delta_j$ is computed based on the power availability at the transmit antennas in the coordinating cells 12 so that the maximum transmit power of the transmit antennas is not exceeded.

The present invention provides one method to compute $(\delta_j, P_j)$ (presumably at the serving BS 20a) for transmission to $K_j$ mobile terminals 50 in the serving cell 12 while limiting interference to mobile terminals 50 within the region of interference avoidance 18. One approach is to let each floating CoMP cell 16 determine the tentative precoding matrix $P_j$ independently while using a simple, low-complexity distributed algorithm for negotiating the power scaling factor $\delta_j$ among overlapping floating CoMP cells 16.

According to one preferred embodiment, the transmit processor for the serving BS 20a in each floating CoMP cell 16 receives the instantaneous channel state information (CSI) from all mobile terminals 50 in the serving cell 12 and some or all mobile terminals 50 in the region of interference avoidance 18 on a regular basis, either through feedback in the reverse link or through measurement in the reverse link in a Time-Division Duplex (TDD) system, and computes the channel state matrix $H_j$. Based on the channel state matrix $H_j$, the transmit processor for the serving BS 20a in each floating CoMP cell 16 first computes the precoding matrix $P_j$ independently. There are many different ways of computing $P_j$ as a function of $H_j$. For example, one way that yields good performance with low computational complexity is to compute $P_j$ as:

$$P_j = \beta H_j^H \left( H_j H_j^H + \frac{\sigma_n^2}{P_T} \left( \sum_{k=1}^{L_j+K_j} n_{r,k} \right) I \right)^{-1}, \quad \text{Eq. (2)}$$

where I denotes the identity matrix, $\sigma_n^2$ denotes the variance of noise-plus-interference observed at the receiver, and $P_T$ denotes the maximum total transmit power of all antennas in all BSs 20 in the coordination set $C_j$. This precoding matrix is referred to herein as a generalized transmit Wiener filter, since the special case where $n_{r,k}=1$ for all k is known as the transmit Wiener filter. The transmit Wiener filter is described in M. Joham, K. Kusume, M.H. Gzara, W. Utshick, "Transmit Wiener Filter for Downlink of TDDDS-CDMA Systems," Proc. IEEE 7-th Int. Symp. On Spread-Spectrum Tech. & Appl., pp. 9-13, Prague, Czech Republic, Sep. 2-5, 2002. Other methods of computing $P_j$ include the zero-forcing precoding, and the multi-user MMSE precoding. Zero-forcing precoding is described in M. Joham, W. Utschick, and J.A. Nossek, "Linear Transmit Processing in MIMO Communications Systems," IEEE Trans. Sig. Proc., vol. 53, pp. 2700-2712, August 2005. Multi-user MMSE precoding is described in H. Karaa, R.S. Adve, and A.J. Tenenbaum, "Linear Precoding for Multiuser MIMO-OFDM Systems," Proc. ICC 2007, pp. 2797-2802, 2007.

According to other embodiments of the present invention, the serving BS 20a may compute the precoding weights based on second-order channel statistics instead of the instantaneous CSI. The serving BS 20a may obtain the channel statistics by averaging the instantaneous CSI over frequency or time at each mobile terminal 50 or at each BS 20 on the reverse link.

Once the tentative precoding matrix $P_j$ is computed for every floating CoMP cell 16 in the mobile communication network 10, serving BS 20a in each floating CoMP cell 16 then computes the power scaling factor $\delta_j$ so that the total power needed to transmit signals for all floating CoMP cells 16 does not exceed the maximum power constraint of any transmit antennas in the floating CoMP cell 16. The serving BS 20a in each floating CoMP cell 16 sends tentative antenna weights, as specified by $P_j$, and the power scaling factor $\delta_j$, or more directly, the scaled tentative weights, as specified by $\delta_j P_j$ to each of the non-serving BSs 20b in the coordination set $C_j$. Each coordinating BS 20 in the floating CoMP cell 16 then computes the transmit signal $x_j$ according to Eq. 1.

To compute the power scaling factor $\delta_j$, the serving BS 20a needs to know the power availability at each transmit antenna in the floating CoMP cell 16. According to one embodiment of the invention, a distributed approach is used to compute the power scaling factor $\delta_j$ for each floating CoMP cell 16. In one approach, referred to herein as the iterative sum-min approach, the serving BS 20a in each floating CoMP cell 16 computes power requirements $\pi_j(m)$ for each transmit antenna m in the CoMP cell 16 based on the tentative precoding weights $P_j$, and sends the power requirements to the non-serving BSs 20b in the coordination set $C_j$. The power requirement $\pi_j(m)$ can be derived from the precoding weight matrix $P_j$ according to:

$$\pi_j(m) = \sum_{l=1}^{n_{s,1}+n_{s,2}+L+n_{s,K_j}} \left| [P_j]_{r_j(m),l} \right|^2, \quad \text{Eq. (3)}$$

where $[A]_{k,l}$ denotes the element in the $k^{th}$ row and $l^{th}$ column of the matrix A, and $r_j(m)$ denotes the row of the tentative precoding matrix $P_j$ that corresponds to the antenna m. In other words, $\pi_j(m)$ is the sum of squared magnitude of the antenna weights specified on the $r_j(m)^{th}$ row of $P_j$.

Each of the BSs 20 in the coordination set $C_1$, including the serving BS 20a, then computes a power margin $\delta(m)$ for each of its transmit antennas based on the power requirements $\pi_j(m)$ from all of the serving BSs 20 in the floating CoMP cells 16 to which that BS 20 belongs. Each BS 20 in the coordination set $C_j$ computes the total or sum power requirement for each of its antennas and compares the computed sum with the maximum power constraint $P_t(m)$ of the antenna to obtain the power margin $\delta(m)$. The power margin $\delta(m)$ for the $m^{th}$ antenna is given by:

$$\delta(m) = \frac{P_t(m)}{\sum_{j:\ \text{antenna } m \text{ in a BS in } C_t} \pi_j(m)}, \qquad \text{Eq. (4)}$$

which may be represented in decibels (dB). The non-serving BSs 20b in the non-serving cells 12 send the power margin δ(m) back to the serving BSs 20 in each of the floating CoMP cells 16 to which it belongs.

The power scaling factor $\delta_j$ is determined by selecting the smallest power margin for all BSs 20 in the coordination set $C_j$. The power scaling factor $\delta_j$ is given by:

$$\delta_j \equiv \min_{m:\ \text{antenna } m \text{ in a BS in } C_j} \delta(m). \qquad \text{Eq. (5)}$$

In some embodiments, the serving BS 20a in each floating CoMP cell 16 may update or re-compute the power requirements $\pi_j(m)$ based on the computed power scaling factor $\delta_j$, and repeat the same process for a fixed number of iterations, or until a predetermined convergence criterion is satisfied. The new power requirements may be computed according to:

$$\pi_j^{new}(m) = \delta_j \pi_j(m) \qquad \text{Eq. (6)}$$

In one exemplary embodiment, the computation of the power scaling factor is repeated until the change in $\delta_j$ is very small for every floating CoMP cell 16. In another embodiment, the computation of power scaling factor is repeated until a certain pre-defined number of repetition is made.

Figure 3:
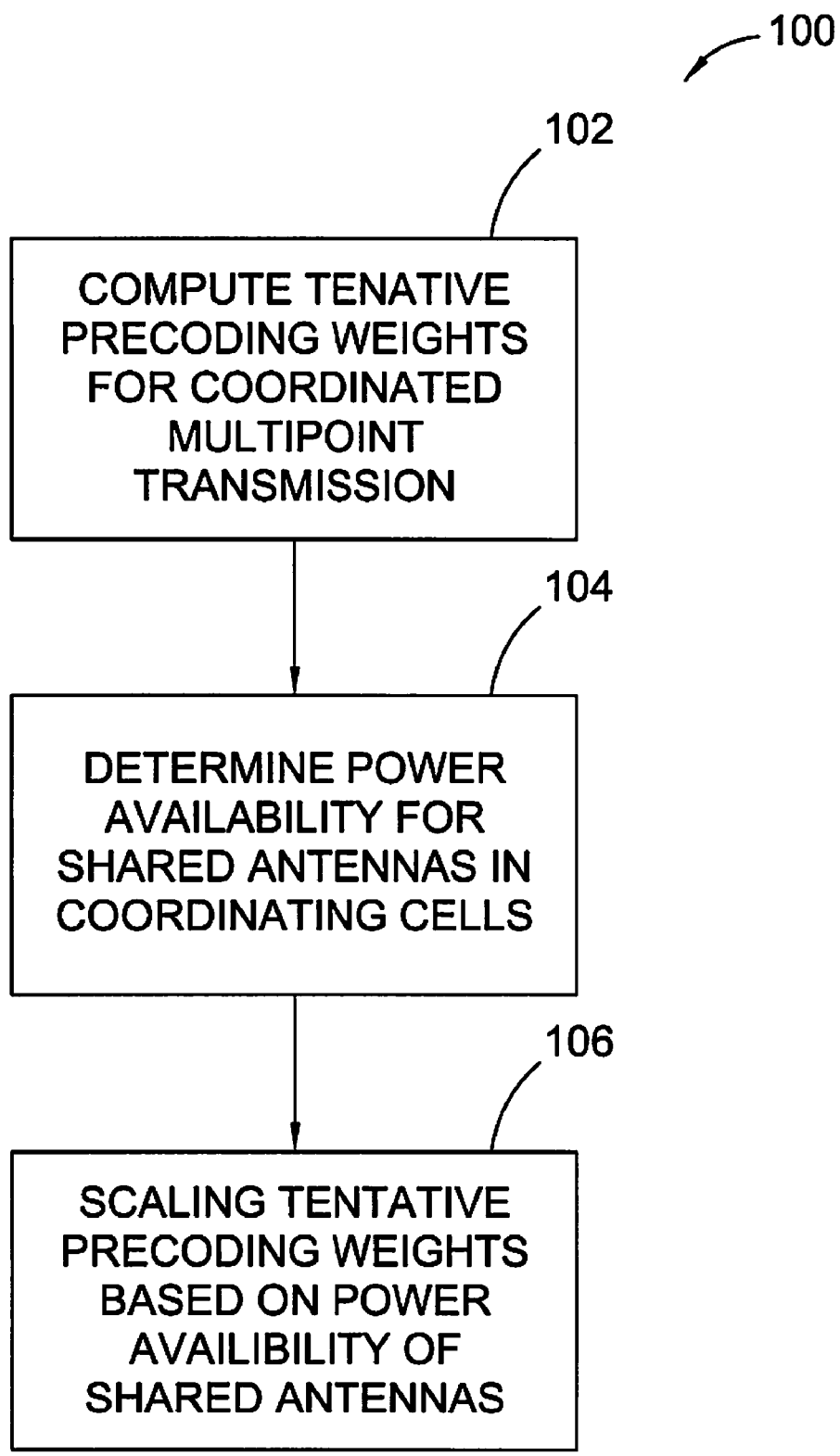
FIG. 3 illustrates a method implemented by a serving cell in a CoMP cell of coordinating multipoint transmissions from two or more coordinating cells in said CoMP cell.

FIG. 3 illustrates an exemplary procedure 100 implemented by the serving BS 20a in a floating CoMP cell 16 for controlling a CoMP transmission to mobile terminals 50 in the serving cell 12. To begin the procedure 100, the serving BS 20a in the floating CoMP cell 16 computes tentative precoding weights for a CoMP transmission from antennas located in different coordinating cells 12 of the floating CoMP cell 16 (block 102). The tentative precoding weights may be computed according to Eq. 2. After obtaining the tentative precoding weights, the serving BS 20a determines the power availability for the shared antennas in the coordinating cells 12 of the floating CoMP cell 16 (block 104). As previously described, the serving BS 20a may send power requirements to the non-serving BSs 20b in the floating CoMP cell 16. The BSs 20 in the coordination sets, including the serving BS 20a, may then compute their respective power margins, which for the non-serving BSs 20b are reported back to the serving BS 20a. The power margins represent the power availability of each antenna. The serving BS 20a may then scale the tentative precoding weights based on the power availability of the shared antennas (block 106). In one embodiment, the serving BS 20a selects the minimum power margin for all the BSs 20 in the coordination set as a power scaling factor, and scales the tentative precoding weights based on the power scaling factor.

Figure 4:
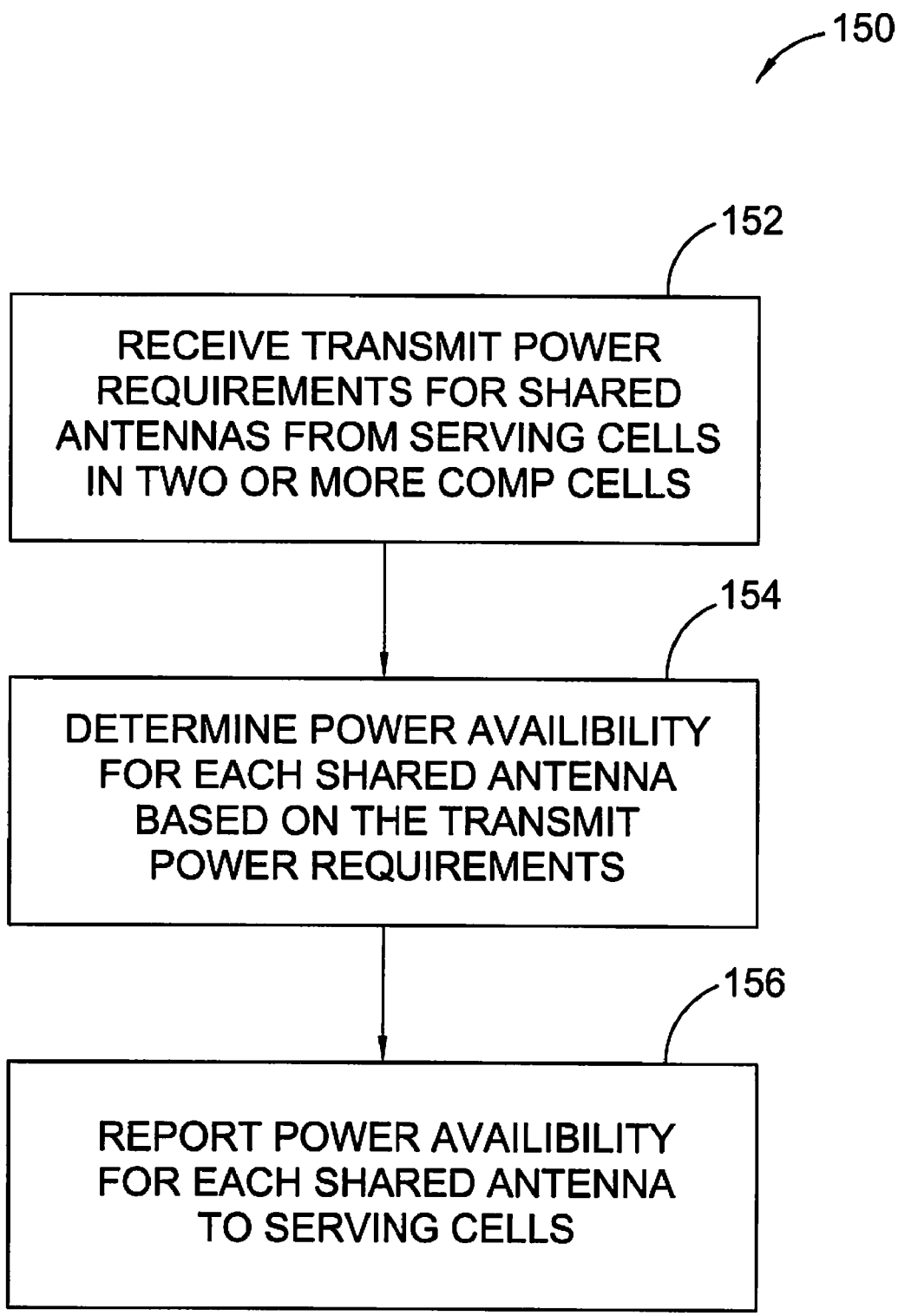
FIG. 4 illustrates a method implemented by a coordinating cell in two overlapping CoMP cells of coordinated multipoint transmissions.

FIG. 4 illustrates an exemplary procedure 150 implemented by a non-serving BS 20b in a floating CoMP cell 16 for determining the power availability of the antennas at the coordinating BS 20. Procedure 150 begins when the non-serving BS 20b receives the transmit power requirements for its shared antennas from the serving cells 12 in two or more floating CoMP cells 16 (block 152). Those skilled in the art will appreciate that the non-serving BS 20b in one floating CoMP cell 16 may, in fact, be a serving BS 20a for another floating CoMP cells 16. The non-serving BS 20b then determines the power availability for each shared antenna based on the transmit power requirements received from the serving cells 12 for each floating CoMP cell 16 to which that non-serving BS 20b belongs (block 154). The power availability or power margin may be computed according to Eq. 4. The non-serving BSs 20b then send the power availability for each shared antenna to the serving BS 20a for each floating CoMP cell 16 to which the non-serving BS 20b belongs (block 156).

Figure 5:
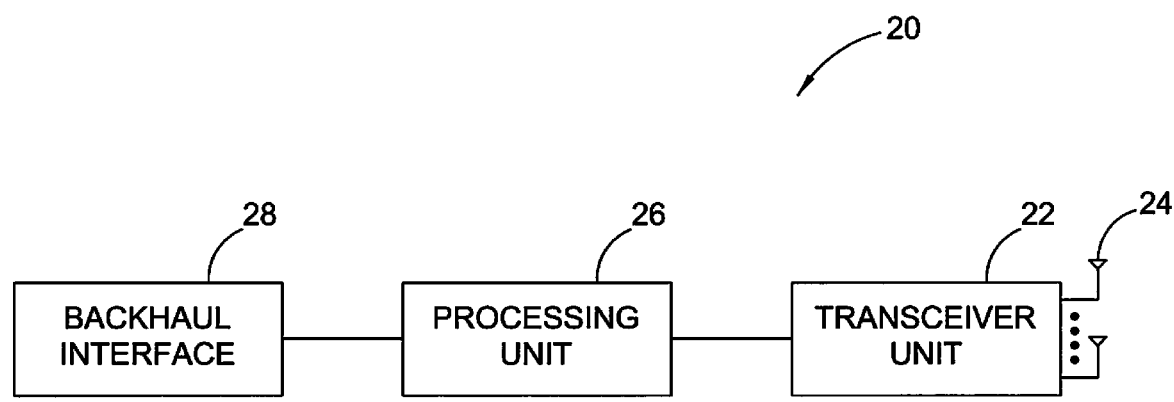
FIG. 5 illustrates an exemplary base station for a serving cell or coordinating cell in a CoMP cell.

FIG. 5 illustrates an exemplary BS 20 comprising a transceiver unit 22 connected to one or more antennas 24, a processing unit 26, and a back haul interface 28. Transceiver unit 22 comprises a conventional cellular transmitter and receiver for communicating with mobile terminals 50 within a cell 12 served by the BS 20. Processing unit 26 processes signals transmitted and received by the BS 20. The processing unit 26 may comprise one or more processors, microcontrollers, hardware, or a combination thereof. Back haul interface 28 connects the BS 20 with a network for communicating with other BSs 20 in the mobile communication network 10.

The distributed architecture shows promise on providing a significant performance gain both in the cell-edge user data rate (as indicated by the 5% user data rate) and in the total system data throughput over the centralized architecture. Moreover, enlarging the region of interference avoidance 18 beyond the cells 12 covered by the coordination set can give additional performance gain, at the expense of more CSI measurement and/or feedback for the network.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method in a transmit signal processor of a serving base station for coordinating multipoint transmissions in a mobile communication network having coordinated multipoint cells that overlap, said method comprising:
   computing by the transmit signal processor tentative precoding weights for a coordinated multipoint transmission from a plurality of transmit antennas in two or more coordinating cells of a coordinated multipoint cell to one or more mobile terminals in a serving cell of the coordinated multipoint cell, at least one of said transmit antennas being shared with an overlapping coordinated multipoint cell;
   determining by the transmit signal processor a power availability for said shared transmit antennas in said coordinated multipoint cell; and
   scaling by the transmit signal processor the tentative precoding weights based on the power availability of said shared transmit antennas to determine final precoding weights for said coordinated multipoint transmission.

2. The method of claim 1 wherein determining power availability for said shared transmit antennas in said coordinated multipoint cell comprises:
   computing power requirements for each shared transmit antenna;
   transmitting said power requirements for said shared transmit antennas to respective coordinating cells in said coordinated multipoint cell containing the shared transmit antennas; and
   receiving from said coordinating cells in said coordinated multipoint cell a power ratio for each shared transmit antenna indicative of the available transmit power for each shared antenna.

3. The method of claim 2 wherein scaling the tentative precoding weights based on the power availability of said shared transmit antennas comprises selecting a minimum power ratio for the shared transmit antennas and scaling the tentative precoding weights by the minimum power ratio.

4. The method of claim 2 wherein the power requirements for each shared transmit antenna are computed iteratively, and wherein, during each iteration, updated transmit power requirements are computed and transmitted to the respective coordinating cells in said coordinated multipoint cell and revised power ratios are received from said coordinating cells in said coordinated multipoint cell.

5. The method of claim 1 wherein computing by the transmit signal processor tentative precoding weights for a coordinated multipoint transmission comprises computing tentative precoding weights for said coordinated multipoint transmission to reduce interference for one or more mobile terminals in an interference avoidance region outside the coordinated multipoint cell.

6. The method of claim 5 wherein computing by the transmit signal processor tentative precoding weights to reduce interference for one or more mobile terminals in an interference avoidance region outside the coordinated multipoint cell comprises:
    determining by the transmit signal processor channel state information for one or more mobile terminals in said interference avoidance region; and
    computing by the transmit signal processor tentative precoding weights for said coordinated multipoint transmission based on the channel state information for said mobile terminals in said interference avoidance region.

7. A serving base station for coordinating transmissions from a plurality of coordinating cells in a coordinated multipoint cell, said serving base station comprising a transmit signal processor configured to:
    compute tentative precoding weights for a coordinated multipoint transmission from a plurality of transmit antennas in two or more coordinating cells of said coordinated multipoint cell to one or more mobile terminals in a serving cell of the coordinated multipoint cell, at least one of said transmit antennas being shared with an overlapping coordinated multipoint cell;
    determine a power availability for said shared transmit antennas in said coordinated multipoint cell; and
    scale the tentative precoding weights based on the power availability of said shared transmit antennas to determine final precoding weights for said coordinated multipoint transmission.

8. The serving base station of claim 7 wherein said transmit signal processor determines power availability for said shared transmit antennas in said coordinated multipoint cell by:
    computing power requirements for each shared transmit antenna;
    transmitting said power requirements for said shared transmit antennas to respective coordinating cells in said coordinated multipoint cell containing the shared transmit antennas; and
    receiving from said coordinating cells in said coordinated multipoint cell a power ratio for each shared transmit antenna indicative of the available transmit power for each shared antenna.

9. The serving base station of claim 8 wherein said transmit signal processor scales the tentative precoding weights by selecting a minimum power ratio for the shared transmit antennas and scaling the tentative precoding weights by the minimum power ratio.

10. The serving base station of claim 7 wherein said transmit signal processor computes the power requirements for each shared transmit antenna iteratively, and wherein, during each iteration, the transmit signal processor computes updated transmit power requirements, transmits the updated transmit power requirements to the respective coordinating cells in said coordinated multipoint cell, and receives revised power ratios from said coordinating cells in said coordinated multipoint cell.

11. The serving base station of claim 7 wherein said transmit signal processor computes tentative precoding weights for said coordinated multipoint transmission so as to reduce interference for one or more mobile terminals in an interference avoidance region outside the coordinated multipoint cell.

12. The serving base station of claim 11 wherein said transmit signal processor computes tentative precoding weights to reduce interference for one or more mobile terminals in an interference avoidance region outside the coordinated multipoint cell by:
    determining channel state information for one or more mobile terminals in said interference avoidance region; and
    computing tentative precoding weights for said coordinated multipoint transmission based on the channel state information for said mobile terminals in said interference avoidance region.

13. A method of coordinating multipoint transmissions in a mobile communication network having coordinated multipoint cells that overlap, said method comprising:
    receiving, from serving cells in two or more coordinated multipoint cells, transmit power requirements for one or more transmit antennas shared by said two or more coordinated multipoint cells;
    determining power availability for each shared transmit antenna based on said received transmit power requirements; and
    reporting said power availability for each shared antenna to said serving cells.

14. The method of claim 13 wherein determining power availability for each shared transmit antenna based on said received transmit power requirements comprises computing a power ratio for each shared antenna based on said transmit power requirements, and wherein reporting said power availability for each shared antenna to said serving cells comprises transmitting the computed power ratio to each serving cell.

15. A base station in a coordinating cell of two or more coordinated multipoint cells, said base station comprising a transmit signal processor configured to:
    receive, from serving cells in two or more coordinated multipoint cells, transmit power requirements for one or more transmit antennas shared by said two or more coordinated multipoint cells;
    determine power availability for each shared transmit antenna based on said received transmit power requirements; and
    report said power availability for each shared antenna to said serving cells.

16. The base station of claim 15 wherein the transmit signal processor computes a power ratio indicative of the power availability for each shared antenna based on said transmit power requirements, and reports the computed power ratio to each serving cell.

* * * * *

UNITED STATES PATENT AND TRADEMARK OFFICE
CERTIFICATE OF CORRECTION

| | | |
|---|---|---|
| PATENT NO. | : 8,107,965 B2 | Page 1 of 1 |
| APPLICATION NO. | : 12/547817 | |
| DATED | : January 31, 2012 | |
| INVENTOR(S) | : Hui et al. | |

It is certified that error appears in the above-identified patent and that said Letters Patent is hereby corrected as shown below:

In column 6, Line 57, delete "$C_1$," and insert --$C_j$,--, therefor.

Signed and Sealed this
Seventeenth Day of April, 2012

David J. Kappos
*Director of the United States Patent and Trademark Office*